July 6, 1926.

O. P. FULLER

HAYSTACKER

Filed August 27, 1924     3 Sheets-Sheet 1

1,591,213

INVENTOR
O. P. Fuller
BY
Fenelon B. Brock
ATTORNEY

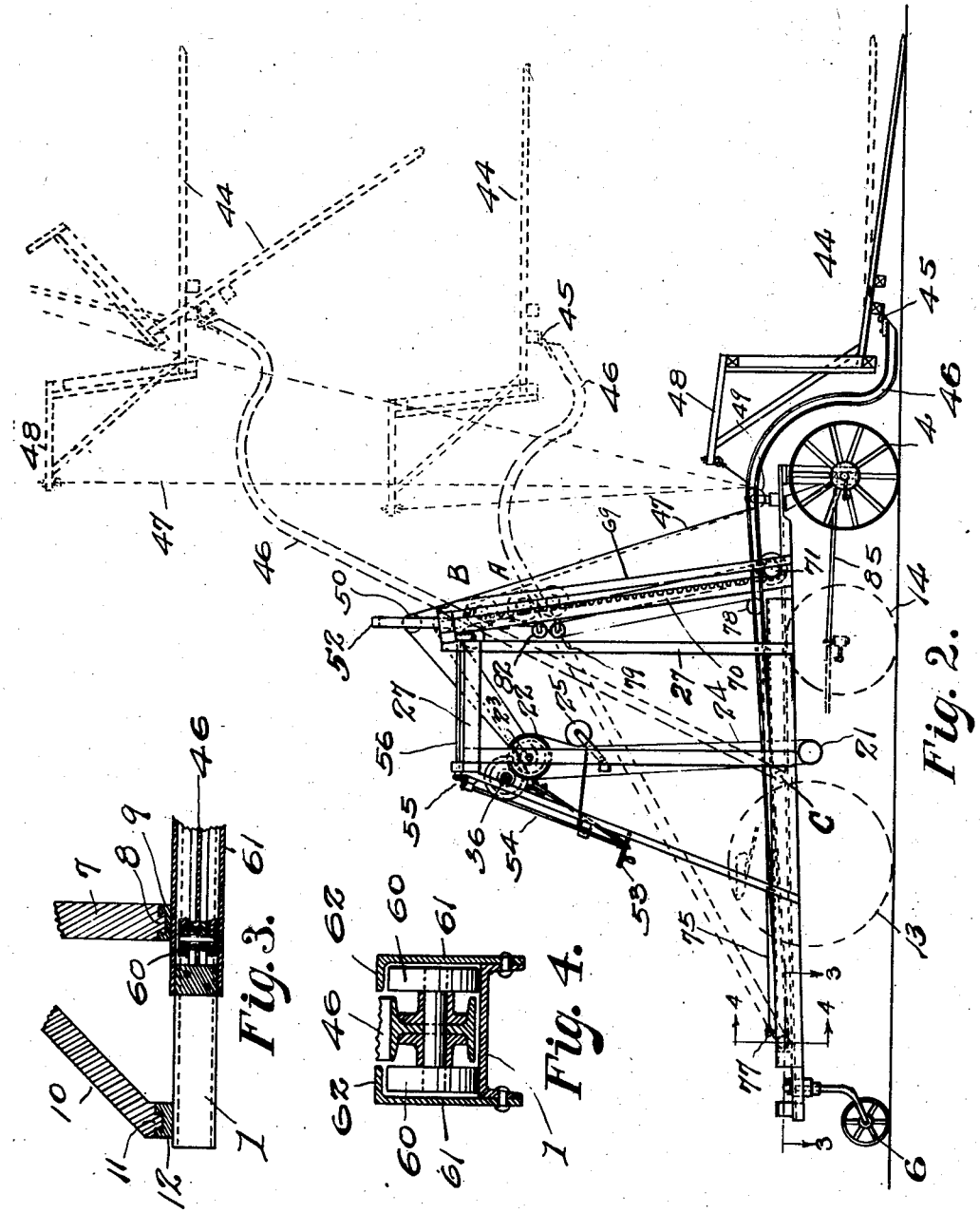

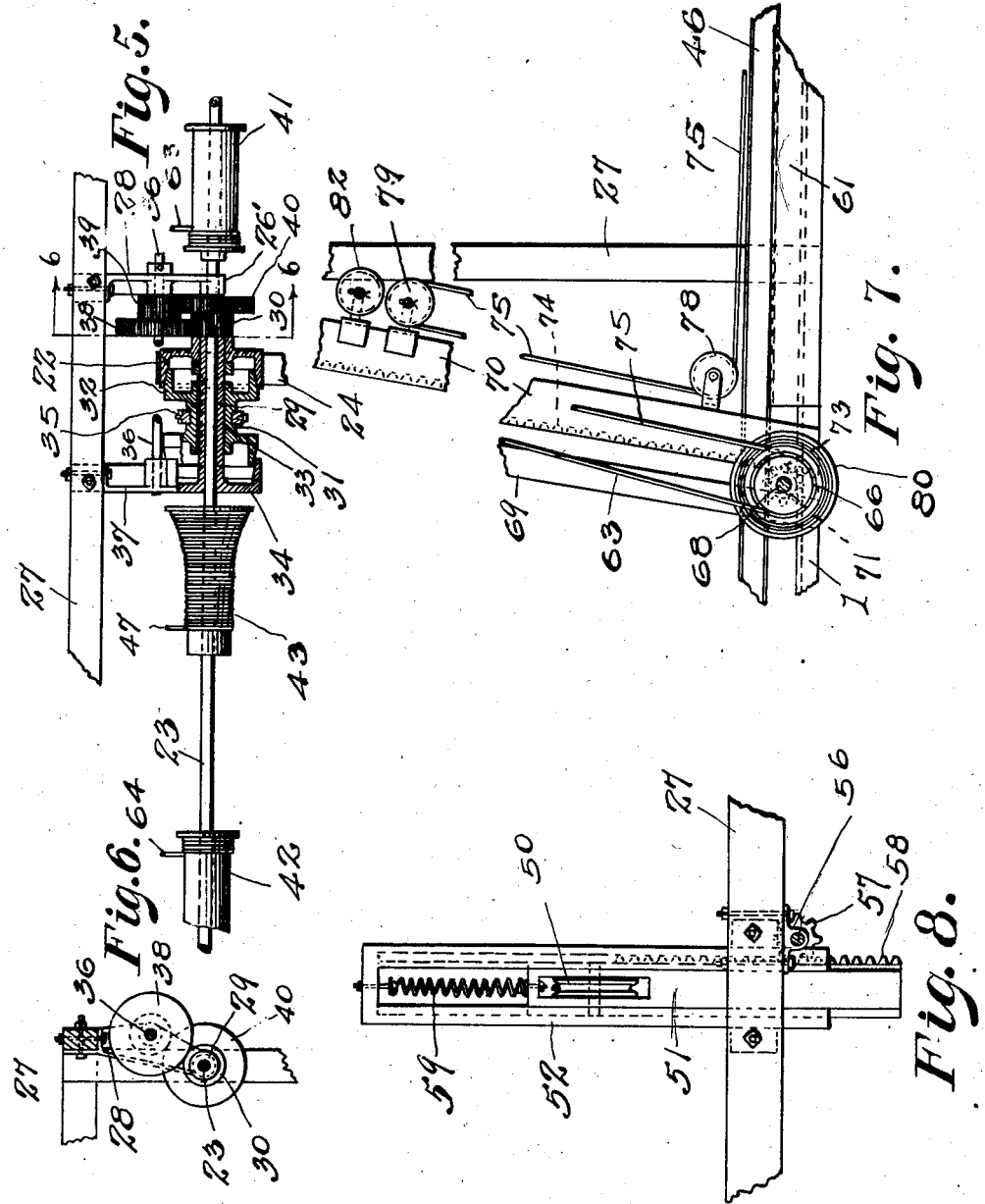

Patented July 6, 1926.

1,591,213

UNITED STATES PATENT OFFICE.

OLIVER P. FULLER, OF WINFIELD, KANSAS.

HAYSTACKER.

Application filed August 27, 1924. Serial No. 734,460.

The invention relates to improvements in hay stackers of the power operated and portable type, by means of which hay and other materials may be gathered as from windrows in the field and the load conveyed to and deposited upon a stack or in a receptacle adapted for the purpose.

The invention involves a vertically swinging rake or load support of the fork type adapted to be elevated and then tilted for dumping the load in the formation of the stack.

For this purpose I employ a portable implement or wheeled vehicle for supporting the operating parts of the haystacker, and use in combination therewith a tractor machine, which is preferably detachable therefrom, for supplying the required power for operation of the stacker mechanism. Means are provided whereby the tractor machine may readily be attached or connected to the implement for propelling and operating the latter, and whereby the tractor may with equal facility be disconnected therefrom when required. Manually controlled mechanism is employed for leveling and for permitting tilting of the support or rake under weight of its load, as will hereinafter be pointed out.

The invention consists in certain novel features of construction and combinations and arrangements of parts as herein illustrated and claimed. In the accompanying drawings I have illustrated one complete example of the physical embodiment of my invention wherein the parts are combined and arranged in accord with the best mode I have thus far devised for the practical application of the principles of my invention, but it will be understood that changes and alterations may be made therein within the scope of my appended claims without departing from the spirit of my invention.

Figure 2 is a side elevation of the implement showing by full and dotted lines three positions of the rake or load support.

Figure 3 is a detail sectional view at line 3—3 of Figure 2, illustrating the method of fastening a removable frame portion, or rear gate of the implement, which is removable for admission of the tractor machine to the interior of the implement.

Figure 4 is an enlarged transverse sectional view of one of the side beams of the implement on line 4—4 of Fig. 2.

Figure 5 is a detail view, with parts in section, of the power shaft of the implement with hoisting drums and operating mechanism thereon.

Figure 6 is a transverse sectional view at line 6—6 of Figure 5.

Figure 7 is a view in elevation as indicated at line 7—7 of Figure 1, showing the hoisting shaft in section, with connections thereto.

Figure 8 is an enlarged view showing the mechanism used in leveling and dumping the load support or rake.

Figure 1:
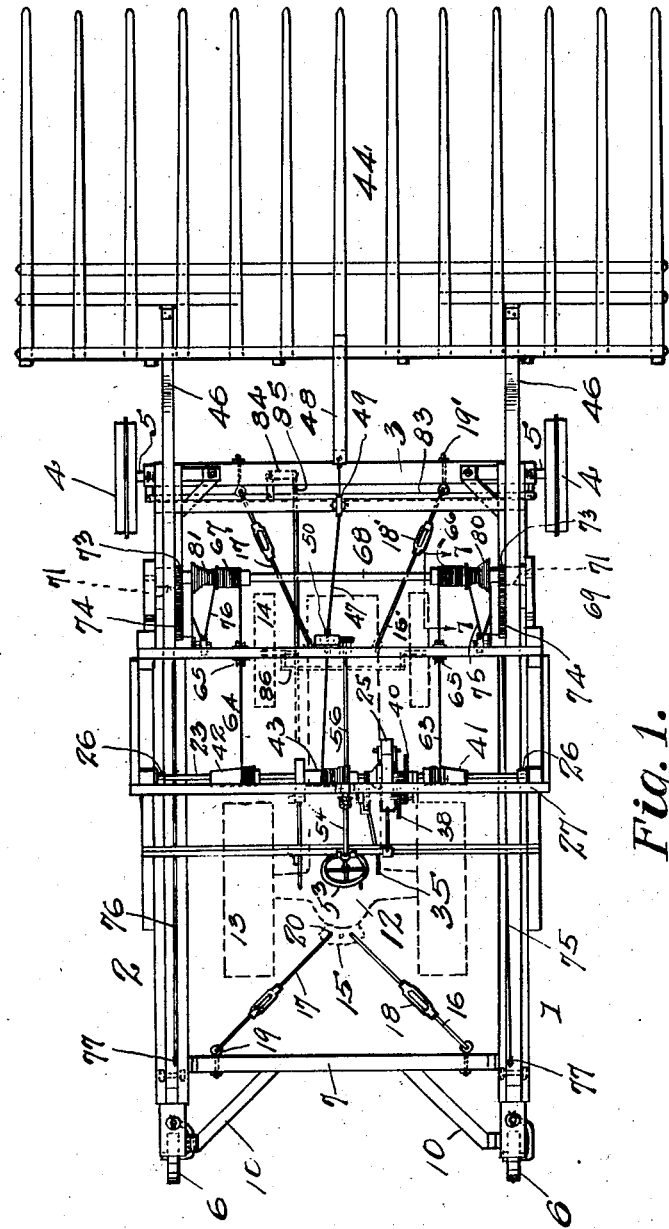
Figure 1 is a plan view of an implement involving my invention and showing a tractor machine in dotted lines connected therewith for propelling and operating the implement.

In the preferred form of the invention as illustrated in the drawings I utilize a frame of rectangular shape which includes a pair of spaced, longitudinally extending channel beams designated as a whole by the numerals 1 and 2, which are rigidly connected at the front of the implement by a cross beam 3. The steering wheels 4 have pivoted stud shafts 5 which are supported beneath the front cross beam, and at the rear of the implement a pair of tiller wheels 6 are swiveled in usual manner.

At its rear end the implement frame is provided with a removable cross bar 7 located between and adapted to connect the two side beams 1 and 2. One of the detachable joints between the cross beam 7 and the side beams is illustrated in Figure 3 where the cross beam is shown with a dovetail tenon 8 seated in a mortised bracket 9 on the side beam 1. The cross beam is also fashioned with a pair of diagonally extending braces 10, 10 which have at their outer ends dovetail tenons 11 adapted to seat in the mortised brackets 12 attached to the side beams 1 and 2. The cross bar 7 with its rigid braces 10, 10, forms a rigid structure that may with facility be attached by means of the several mortise and tenon joints to the side beams of the implement frame, and this structure may with equal facility be removed from the frame when required.

This removable frame portion or end gate may be removed from the implement frame by lifting the former from the latter for the purpose of admitting a tractor machine as 12 within the frame. A conventional form of tractor or tractor machine is illustrated by dotted lines in Figures 1 and 2, with the traction wheels 13 and the front steering wheels 14 also illustrated. At the rear of the tractor machine a perforated flange 15 is designated to which a pair of diagonally extending brace rods 16 and 17 are connected. These rods are provided with turn buckles 18 and are connected to the cross bar 7 by eye bolts 19. At the front of the implement a complementary pair of diagonal brace rods 16' and 17' having turnbuckles 18' are connected to the tractor and to eye bolts 19' of the cross bar 3 of the implement frame. The inner ends 20 of these rods are pivoted to the tractor, and the outer ends of the rods are slipped into the eye bolts to rigidly couple the tractor with the implement, the turn buckles being tightened to form a rigid coupling structure.

In order that the portable implement may be propelled under power from the tractor machine 12 the tractor is maintained in proper relation thereto by these coupling members and the tractor is held in alined position for supplying the power necessary to operate the stacker mechanism. For transmission of power from the tractor to the implement for the operation of the latter I show a belt pulley 21 in Figure 2 carried by the tractor and actuated therefrom. This pulley is located in line with a cone clutch pulley 22 carried loosely on the power shaft 23 of the implement, and a power transmission belt 24 passes around these pulleys. A belt tightener 25 of suitable type is shown in Figure 2 for adjusting the belt 24 between the pulleys after the tractor has been coupled or affixed in operative position within the implement frame.

The power shaft 23 is disposed transversely of the implement and located in an elevated position with end journal bearings 26 supported in the upper frame 27 of the implement and an intermediate bearing 26' in the hanger 28 supported from the frame 27.

A short hollow or tubular shaft 29 encases a portion of the power shaft 23 as shown in Figure 5, upon which tubular shaft the cone pulley 22 is journaled loosely, and adjacent to the pulley a spur pinion 30 is rigidly secured to and revolves with the tubular shaft. This tubular shaft also has keyed thereon a laterally slidable member 31 having a conical clutch head 32 for co-action with the cone pulley 22, and a clutch head 33 for co-action with the complementary brake cone 34. In Figure 5 the clutch members 32 and 22 are shown in frictional contact and it will be understood that the double clutch member 31 may be shifted to the left by actuating a clutch lever 35 to disengage these clutch members and engage the brake members 33 and 34 for the purpose of holding the mechanism of the implement in stationary position.

Preferably a train of reducing gears is employed between the driving pulley 22 and shaft 23 which train is actuated from the pinion 30 as follows. A countershaft 36 is located parallel with the power shaft 23 and journaled in bearings of the two hangers 28 and 37, and power is transmitted through pinion 30 to the large gear 38 and small gear 39 on the countershaft. The latter gear meshes with a gear 40 keyed to the power shaft 23, and through gear 40 the power shaft is revolved.

Three drums as 41, 42, and 43 are carried by and revolve with the power shaft 23, and these drums are of suitable shape and size for the purposes to be specified.

The rake or hay gatherer 44 shown in Figures 1 and 2 is located at the front of the implement, and is pivoted at 45 transversely of the implement on the forward ends of the downwardly extending arms 46. These arms are spaced at the sides of the implement and extend longitudinally thereof, and the rake is adapted to be tilted on the pivots 45 of the arms for the purpose of leveling the rake after a load has been gathered thereon, and also for the purpose of dumping the load at the proper time and place.

This tilting movement of the rake or load support is manually controlled by means of a cable 47 attached to an arm 48 of the rake, which cable, after passing under a guide pulley 49 carried at the front of the implement, extends upwardly and over a second guide pulley 50 journaled in the vertically movable slide bar or rack bar 51. The cable extends through a slot in the bar and thence to the drum 43 on the shaft 23. The rack bar 51 forms an element of the leveling and dumping mechanism for the tiltable rake, and it is guided in its vertical movement by means of a yoke 52 secured on the upper frame 27 of the implement. A hand wheel 53 (Figures 1 and 2) located in convenient position for the operator of the stacker is provided with a shaft 54, and this shaft is adapted to transmit motion through a bevel gear-couple 55 to the countershaft 56 journaled at the top of the frame 27, and extending longitudinally of the machine in alinement with the shaft 54.

The shaft 56 carries a rack wheel 57 for engagement and coaction with a rack 58 on the rack bar 51 for actuating the latter. A counterbalancing spring 59 is interposed between the upper end of the rack bar 51 and the top of the yoke 52 for the purpose of resiliently holding the rack bar against downward movement and for elevating the rack bar to normal position.

While in the full line position of Figure 2 the rake is adapted to gather a load of hay and the rake and its load are then elevated in a vertical plane to the dotted line positions through the manipulation of the two rake arms 46. These arms at their rear ends have a traveling or movable pivotal point in connection with the side beams 1 and 2 of the implement frame, in order that the rake may be elevated in a vertical plane while the rear ends of the arms move longitudinally and in substantially a horizontal plane along the side beams 1 and 2 of the implement.

For this purpose each rake arm 46 at its rear end is provided with a pair of rollers 60 which rest upon and roll over the top faces of the channel beams or tracks 1 and 2. Side plates 61 are riveted or bolted at opposite sides of these beams 1 and 2, and these plates are fashioned with top flanges 62 extending inwardly over the path of movement of the rollers 60 to form guides for the rollers. The side plates prevent lateral displacement of the rollers and the top flanges prevent the rollers from rising from the guide beams.

This vertical movement of the rake and swinging movement of the arms 46 are accomplished from the two drums 41 and 42 on the shaft 23, about which drums two hoist cables 63 and 64 are wound. These cables extend forward of the implement over a pair of guide pulleys 65 journaled in brackets attached to the upper part of the frame 27, and the cables then pass downwardly to a pair of drums 66 and 67 about which they are wound or coiled. The drums 66 and 67 are fixed to rotate with a transversely disposed shaft 68 which is designed to travel upwardly and downwardly in a plane slightly inclined to the perpendicular, between pairs of guide bars 69 and 70 attached at the respective outsides of the beams 1 and 2.

At each of its ends the shaft 68 is provided with a roller 71 located beneath and bearing against the under faces of the rake arms 46 for a rolling contact therewith as the forward ends of these arms are lifted by movement of the shaft 68 to elevate the rake. In its up and down movement while remaining in a horizontal plane, the shaft 68 is guided by means of a pair of spaced pinions 73, one at each end of the shaft, that mesh with complementary racks 74, one on each of the two braces 70.

As the power shaft 23 is revolved the cords 63 and 64 are wound upon the two drums 41, and 42, and these cords or cables are unwound from the respective drums 66 and 67. This unwinding movement of the drums 66 and 67 revolves the shaft 68 with its pinions 73. The rotating pinions in mesh with the two racks 74 are thus caused to travel upward carrying the shaft 68. The rollers 71 on the shaft 68 bear up against the under faces of the arms 46 and lift the front ends of said arms together with the rake 44 as indicated in dotted lines in Figure 2, and the rollers 60 at the rear ends of the arms 46 travel forward in their tracks. As the arms 46 are elevated the cable 47 unwinds from its drum 43 sufficiently to insure a level position of the rake 44 as it is being elevated.

To insure the proper vertical lifting movement of the rake arms, the rear ends of these arms are positively moved on their rollers in a horizontal or substantially horizontal plane with a gradual rolling action of the rollers 60. For this purpose a pair of compensating cables 75 and 76 are attached to eye bolts 77 near the rear ends of the rake arms 46, and these cables extend forwardly of the implement at the sides thereof and under guide pulleys 78 on the rear edge of the braces 70. After passing under these pulleys 78 the cables 75 and 76 extend upwardly and over pulleys 79, supported from the braces 70 at the required height, and thence downwardly to wind on the drums 80 and 81 respectively on the shaft 68 adjacent to the drums 66 and 67. A guide pulley 82 journaled in a bracket supported on each of the braces 70 at the sides of the implement, is located in the path of movement of each of the cables 75 and 76. These cables are adapted to engage these pulleys which become effective to guide the cables when the shaft 68 and drums 80 and 81 pass upwardly above the pulleys 82. As soon as the shaft 68 passes upwardly above the pulleys 82 to the position indicated at A in Figure 2, the drums 80 and 81 start to wind the cables 75 and 76 at a greater speed and a greater length of these cables is wound on the drums than the distance the shaft is lifted. Therefore when the shaft 68 reaches the position B in Figure 2 the winding of the cables 75 and 76 around the drums 80 and 81 will cause the rear ends of the arms 46 to move to the point C in Figure 2, thereby permitting the elevation of the rake or load support in a vertical plane, as required.

The drums 80 and 81 are of conical shape and grooved, and because of the increasing diameter of these drums a greater length of the cables 75 and 76 will be wound on the drums than the distance traveled by the shaft 68 in order that the rake shall be maintained in its horizontal position during its elevation.

After the load has been elevated to the upper position of Figure 2 the tractor 12 is operated to propel the implement to its destination. The implement is guided by the steering mechanism of the tractor as indicated in Figure 1 where the stub axles 5 of the implement are connected by a steering rod 83 with a bell crank lever 84 pivoted on the front cross bar 3 of the implement, and the bell crank lever is connected by a longitudinally extending rod 85 to the transverse steering rod 86 of the tractor. The tractor is steered by suitable operating mechanism in usual manner.

When the destination is reached, the load is dumped from the rake through manipulation of the hand wheel 53 which is turned to revolve the shaft 56 and through pinion 57 and rack 58 lower the slide rack bar 51 and pulley 50. The downward movement of this pulley releases tension of the cable 47, and consequently the weight of the load on the rake is permitted to tilt the rake on its pivots 45 to the uppermost position of Figure 2 for dumping the load.

After the load has been dumped the hand wheel 54 is turned to elevate the slide rack bar 51 to restore the rake to full line position of Figure 2, or this restoration may be accomplished by the contractile action of the spring 59.

When the rake is again loaded the hand wheel is turned to slightly elevate the slide rack bar 51 and its pulley 50, and thus through the cable 47 the arm 48 is depressed and the rake is swung on its pivots 45 to the horizontal dotted position indicated. For transportation purposes and when the rake is not desired for use it may be elevated to one of the upper dotted line positions of Figure 1 and the implement may be then propelled by the tractor. When use of the tractor is desired for other purposes the tractor may be detached from operative connection with the implement by removal of the power belt 24, after which the coupling rods 16 16' and 17 17' are disconnected, and the rear end gate 7 with its braces is removed from the implement frame. The tractor may then be backed out from the interior of the frame and used as desired.

Various changes and alterations are contemplated in the size, shape and mechanical arrangement of parts heretofore referred to in connection with the exemplification of my invention as shown in the drawings, and it will be understood that such changes may be made within the scope of my claims without departing from the principles of my invention.

Having thus fully described my invention, what I claim as new and desire to secure by Letters Patent is—

1. The combination in an implement as described having a main frame and an upper supporting frame, of a pair of spaced arms each having a traveling pivotal connection with the main frame and a load support pivoted at the free ends of said arms, a rotatable shaft having bearing devices beneath said arms and means for operating said shaft, a drum fixed on the shaft and a cable and operative connections for co-action with said drum, guiding means on the upper frame and complementary means on said shaft for co-action therewith whereby the shaft is elevated as the cable is operated.

2. The combination with a main frame, a pair of spaced arms each having a traveling pivot thereon, a tiltable rake carried by said arms, and an upper frame, of an elevating shaft having bearings under said arms, a drum on said shaft, an operating cable and actuating means therefor, complementary means on said upper frame and shaft whereby the shaft is elevated as the cable is operated, and compensating means between said shaft and arms for positively moving said traveling pivots.

3. The combination with a main frame, a pair of spaced arms each having a traveling pivot thereon, a tiltable rake carried by said arms, and an upper frame, of an elevating shaft having bearings under said arms, a drum on said shaft and an operating cable and actuating means therefor, a pair of spaced compensating drums on said shaft and cables thereon connected to said arms for positively moving said pivots as the shaft is elevated, and complementary means on said upper frame and shaft whereby the shaft is elevated as the first cable is actuated.

4. The combination with a main frame, a pair of spaced arms each having a traveling pivot thereon, a tiltable load support carried by said arms, and an upper frame, of an elevating shaft having bearing rollers beneath said arms, spaced pinions on said shaft and complementary rack bars therefor in said upper frame, and means for revolving said shaft.

5. The combination with a main frame, a pair of spaced arms each having a traveling pivot thereon, a tiltable load support carried by said arms, and an upper frame, of an elevating shaft having bearing rollers beneath said arms, spaced pinions on said shaft and complementary rack bars therefor in the upper frame, a drum on the shaft, a cable and actuating means therefor, a pair of spaced drums on said shaft, and cables thereon connected to said arms whereby the traveling pivots are moved as the arms are elevated.

6. The combination with a main frame, a pair of spaced arms each having a traveling pivot thereon, a tiltable load support carried by said arms, and means for elevating said load support, of an upper frame, a reciprocable supporting member therein, a leveling cable connected to said load support and suspended in said member, and means for actuating said member to release the tiltable load support.

7. The combination with a main frame, a pair of spaced arms each having a traveling pivot thereon, a tiltable load support carried by said arms, and means for elevating said load support, of an upper frame and a rigid yoke thereon, a reciprocable member supported in said yoke and a suspending pulley journaled in said member, a leveling cable connected to said load support and suspended over said pulley, and means for actuating said member to release the tiltable load support.

8. The combination with a main frame, a pair of spaced arms each having a traveling pivot thereon, a tiltable load support carried by said arms, and means for elevating said load support, of an upper frame and a rigid yoke thereon, a reciprocable member supported in said yoke and a rack bar on said member, a rack wheel and its shaft, means for revolving said shaft, a pulley journaled in said member, and a leveling cable connected to said load support and suspended over said pulley.

OLIVER P. FULLER.